United States Patent [19]
Remond et al.

[11] 3,886,668

[45] June 3, 1975

[54] DRYING OF ARTICLES

[75] Inventors: Jean-Pierre Remond, Massy-Villaine; Jean-Robert Thebault, Paris; Jean-Claude Vitat, Antony, all of France

[73] Assignee: Rhone-Progil, Courbevoie, France

[22] Filed: May 15, 1974

[21] Appl. No.: 469,953

[30] Foreign Application Priority Data
May 16, 1973 France ............................. 73.17693

[52] U.S. Cl. .......................................... 34/9; 34/60
[51] Int. Cl. ............................................. F26b 3/00
[58] Field of Search .................................... 34/9, 60

[56] References Cited
UNITED STATES PATENTS
3,386,181  6/1968  Steinacker .............................. 34/9
3,710,450  1/1973  Figiel ..................................... 34/60

Primary Examiner—John J. Camby

[57] ABSTRACT

Method and apparatus for removing moisture from the surface of an article by immersion in a liquid which is not miscible with water, comprising a water removal tank containing the liquid, at least one decantation tank for separating water from the liquid and a recycling circuit for the liquid connecting the decantation tank to the water removal tank, a first rinsing tank positioned adjacent the water removal tank having a space above the water removal tank and first rinsing tank with condenser means, means for passing excess liquid from the first rinsing tank into the water removal tank and from the water removal tank into the decantation tank, a second rinsing tank provided with a condenser and means for passing excess liquid from the second rinsing tank into the first rinsing tank, means for recovering the condensate above the water removal tank and the first rinsing tank in the space above the second rinsing tank, means for eliminating water from said condensate and means for passing the condensed solvent into the second rinsing tank, and a third rinsing tank provided with a condenser and means for eliminating water contained in the condensate from the third rinsing tank and means for passing the condensed solvent into the third rinsing tank.

8 Claims, 4 Drawing Figures

DRYING OF ARTICLES

The present invention relates to a process for eliminating water from the surface of an article by immersion in a liquid composition not miscible with water and also to apparatus for carrying out this operation.

During treatment of certain articles, such as assemblies for electronic circuits, they may come into contact with water which tends to wet the surfaces. Thus, during the operations of storing and cleaning of metal members, their surfaces may retain water. In the electric and electronic industries, elements to be cleaned often have plastics materials as supports and in certain cases the members to be cleaned superficially are washed in water to eliminate substances, such as water soluble salts or residues from solder flux. In other cases, humidity in the ambient air may have a bad effect on the proper functioning of the members if the latter are not dried and stored in closed containers before use. Further, the presence of water on metallic surfaces exposes them to corrosion phenomena which may produce alterations in their mechanical and/or electrical properties, which alterations are generally undesirable.

It is known that it is possible to eliminate water from the surface of an article using a process which consists of immersing the article successively in a bath (A) for elimination of water maintained at boiling point comprising a liquid composition which is not miscible with water, then in a rinsing bath (B) also maintained at boiling point, consisting of a solvent which is a constituent of the liquid composition in bath A, to pass the vapors consisting essentially of solvent leaving baths A and B and condensing said vapors, eliminating water which may be contained in the condensate, passing the condensed solvent into the bath B, passing the excess of solvent from bath B into the bath A and recycling to the bath A excess of liquid from bath A after removal of water therefrom.

However, when the frequency of passage of the articles through the baths is high or in the case of articles of complex geometrical form including undulations, it is known that such rinsing may not be complete. When the articles are removed from bath A they are wetted by the drying composition which generally contains a small quantity of surface active agent. This surface active agent is transported into the rinsing bath B. Thus the rinsing is not effected in a bath of solvent which is pure and it follows that traces of the surface active agent are retained by the articles.

It has already been suggested to carry out a supplementary rinsing of the articles after removal from bath B by passage in a second rinsing bath also maintained at boiling point, but for the same reason the result obtained, even though improved, is not always perfect.

It has also been suggested to carry out supplementary rinsing of the articles after removal from bath A by passing them through vapors present in the space above bath A and bath B while maintaining bath B at a temperature considerably less than the boiling point of the solvent. There is achieved a total absence of traces of surface active agent on the articles but the vapors leaving baths A and B contain a certain amount of water, the articles thus taking up some water from the vapor.

The process, according to the invention, is intended to avoid or reduce these disadvantages and is intended to achieve improved or perfect rinsing, whatever the shape of the articles to be treated and the rate of passage of the articles through the rinsing baths.

According to one aspect of the invention there is provided a process for removing water from the surface of an article in which said article is immersed successively (i) in a bath A for removal of water, maintained at boiling point, consisting of a liquid drying composition which is not miscible with water and which comprises a solvent, (ii) in a rinsing bath B, also maintained at boiling point, consisting of said solvent, (iii) in a rinsing bath C consisting of said solvent maintained at a temperature appreciably less than its boiling point, and (iv) in the vapor emitted by a bath D consisting of said solvent maintained at boiling point, the following operations being carried out continuously:

a. the vapors leaving baths A and B and the vapors leaving bath C are separately condensed, any water contained in the condensate is removed, the condensed solvent is passed into the bath C, excess solvent from bath C is passed into bath B, excess solvent in bath B is passed into bath A and the excess of liquid from said bath A is recycled into bath A after elimination of water therefrom;

b. the vapor leaving bath D is condensed, any water contained in the condensate is removed and the solvent is recycled to bath D.

The required difference between the temperature of bath C and the boiling point of the solvent may vary according to the nature of the solvent used. By way of example, in the case where the solvent used is 1,1,2-trichloro 1,2,2-trifluoroethane of which the boiling point is 47.6°C, the difference is generally at least 10°C.

The required duration of the immersion of the articles in each of the baths A, B or C depends on numerous factors, such as configuration of the surface of the articles, the drying composition used, and the regeneration capacity of the bath. It generally varies from 1 to 3 minutes. The duration of the immersion in the vapor issuing from bath D is generally from 15 to 30 seconds.

According to another aspect of the invention, apparatus for removing water from the surface of an article comprises a tank for removing water containing the bath A and comprising means for heating the liquid composition, at least one decantation tank for removing water from the composition, and a recycling circuit for the liquid composition connecting the decantation tank to the tank for the elimination of water.

The apparatus also comprises three tanks for rinsing containing respectively the baths B, C and D.

The first rinsing tank, containing the bath B, comprises means for heating the liquid and is arranged in the neighborhood of the tank for removing water. The space above the water-removing tank and the first rinsing tank is surrounded by walls, the upper part of the walls being surrounded by a condenser. Means are provided for passing the liquid leaving the first rinsing tank into the water-removing tank as well as means for passing the liquid leaving the water-removing tank into the decantation tank.

The space above the second rinsing tank containing bath C, is surrounded by walls, the upper parts of the walls being surrounded by a condenser. Means are provided for passing the liquid from the second rinsing tank into the first rinsing tank.

There is also provided means for recovering the condensate obtained by condensation of vapor obtained respectively from the space situated above the water-removing tank and the first rinsing tank and the space above the second rinsing tank, means for eliminating any water contained in said condensates, and means for passing the condensed solvent into the second rinsing tank.

The third rinsing tank, containing the bath D, comprises heating means for the liquid therein. The space situated above the third rinsing tank is surrounded by walls, the upper parts of the walls being surrounded by a condenser. Means are provided for eliminating any water contained in the condensate and means for passing the condensed solvent into the bath D.

Preferred embodiments of apparatus according to the invention will be described by way of example with reference to the accompanying drawings, in which.

Figure 1:
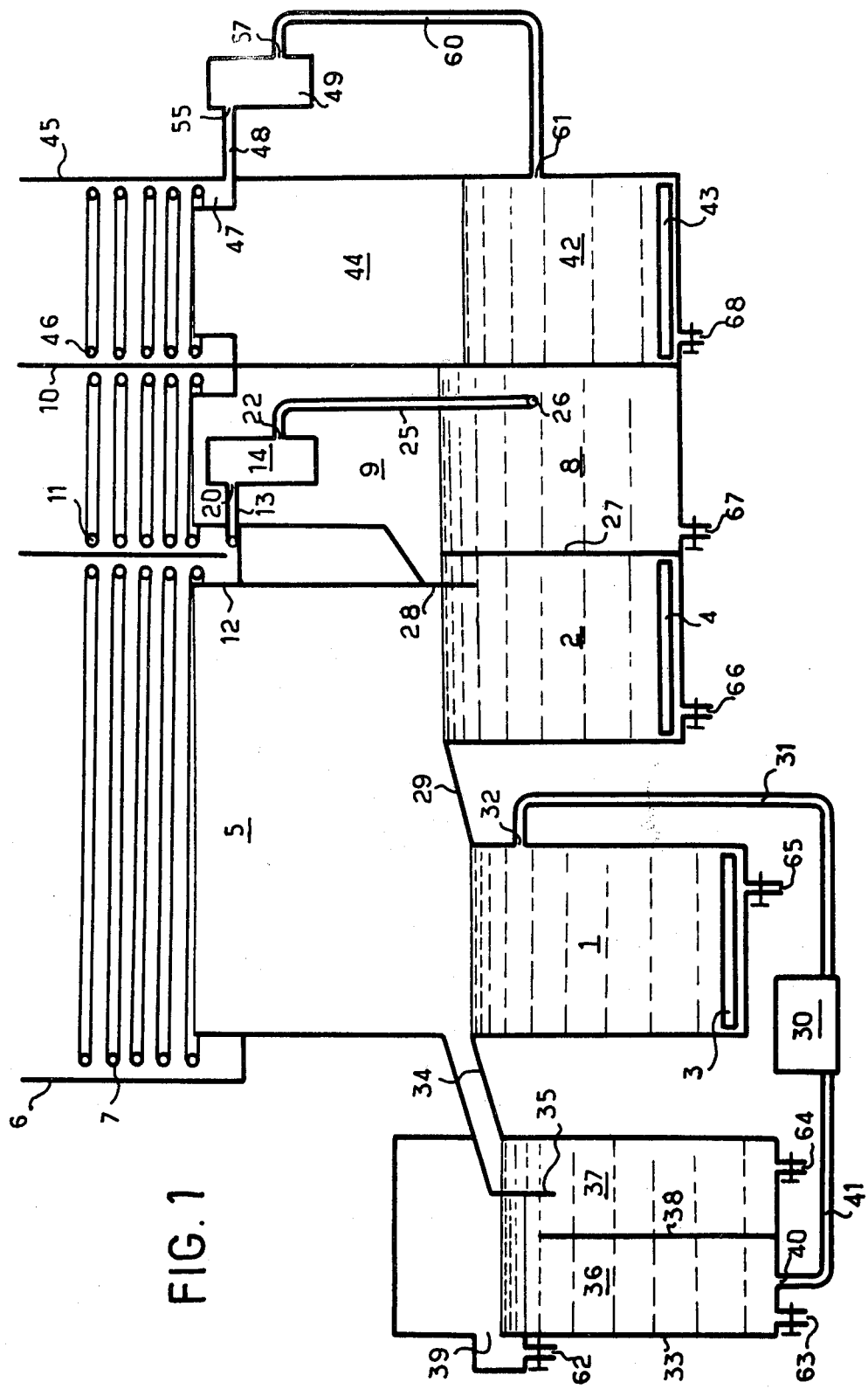
FIG. 1 is a schematic elevational view of the apparatus.
Figure 2:
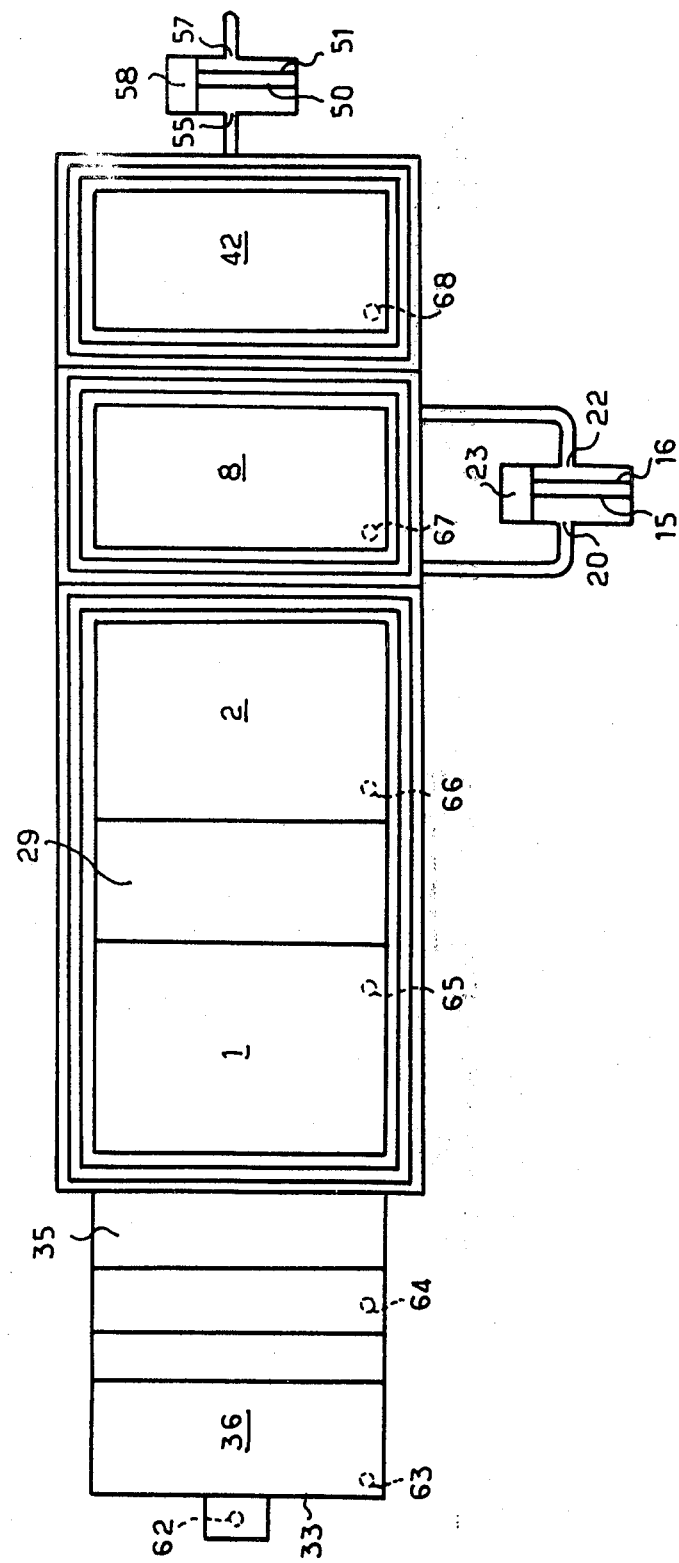
FIG. 2 is a view of the apparatus of FIG. 1 from above.
Figure 3:
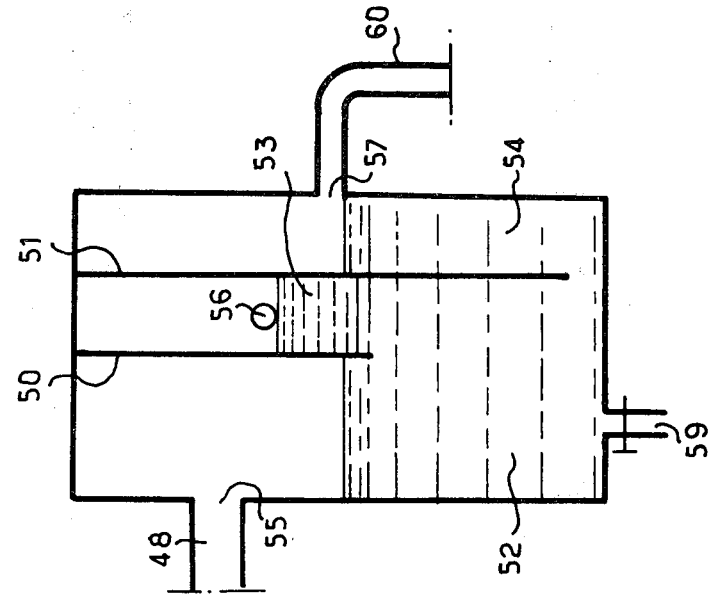
Figure 4:
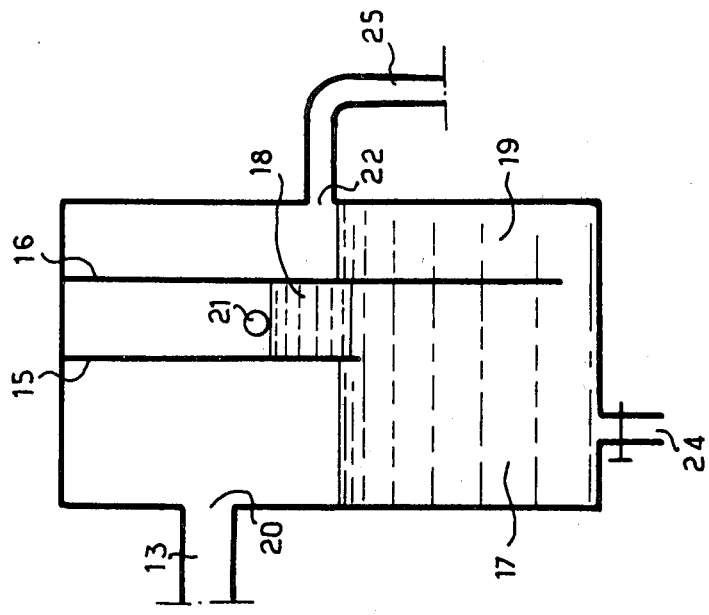

FIG. 3 is a section of a phase separator, for use in the apparatus of FIG. 1, to eliminate any water contained in the condensates obtained by condensation of the vapors leaving respectively the space situated above the tank for elimination of water and the first rinsing tank and from the space situated above the second rinsing tank; and FIG. 4 is a section of a phase separator for use in the apparatus of FIG. 1 to eliminate any water contained in the condensate obtained by condensation of vapor leaving the space situated above the third rinsing tank.

With reference to FIGS. 1, 2, 3 and 4, the process will now be described together with the apparatus.

The bath A, contained in the tank 1, is maintained at boiling point by means of the heating apparatus 3 which may be an electric heater. The boiling allows efficient agitation of the bath which favors the mechanical elimination of water from the surfaces to be treated.

The bath B, contained in the tank 2, is maintained at boiling point by means of a heating device 4 which may be an electric heater.

In certain cases the agitation of baths A and B may be reinforced by the use of known devices, preferably ultrasonic.

The vapor emitted from tanks 1 and 2 rises towards the space 5 situated above said tanks which is surrounded by the wall 6 and is condensed by the coils 7 in which circulates a cold fluid, such as water. The coils 7 are fixed on the upper parts of the wall 6.

The vapor leaving the tank 8, containing the bath C, advantageously agitated by means of ultrasonic devices, rises in the space 9 situated above said tank and surrounded by the walls 10 and is condensed by the coils 11 in which circulates a cold fluid, such as water. The coils 11 are fixed on the upper parts of the walls 10.

The condensates obtained by condensation of vapor rising respectively in spaces 5 and 9 are recovered in the duct 12 and flow through the duct 13 into the water separator 14 composed of a tank internally divided by two partitions 15 and 16 (see FIG. 3) into three compartments 17, 18 and 19 which communicate with each other only at their lower part.

The water separator 14 further comprises an inlet 20 for solvent/water mixture, an outlet 21 for water, an outlet 22 for solvent, a cooling jacket 23 through which a cold fluid, such as water, passes, and a draining valve 24.

The water separator 14 has as its object elimination of water which may be contained in the condensate and which may be derived either from atmospheric humidity or from water introduced with the articles into the tank 1 and which may be entrained with the solvent in the space 5 during boiling of bath A.

In the case where the agitation is increased in at least one of the baths A and B, as by ultrasonic means, the condensate obtained by condensation of vapor rising in the space 5 may be present in the form of a microsuspension of droplets of water in the solvent which renders difficult the elimination of water in the separator 14 in a time short enough to be compatible with efficient functioning of the apparatus. It is therefore advantageous to destroy the micro-suspension before introduction of the condensate into the separator 14, by continuously passing said boiling condensate through a vessel, for example, provided with a heating device and surmounted by a system for condensation of vapor.

The water/solvent mixture arriving by the duct 13 enters the separator 14 through the inlet 20 and becomes separated into its constituents by decantation in the first compartment 17 of the separator 14.

The greatest part of the water, which is separated, is found in compartment 18 and is eliminated by the outlet 21. By gravity the solvent passes only into compartment 19 and returns to tank 8 through the outlet 22, the duct 25, and the inlet 26.

The excess solvent from the bath 8 overflows continuously into the tank 2 above the partition 27 separating the tanks 2 and 8.

A deflector 28 prevents passage of vapor containing moisture from the space 5 into the space 9.

Excess of solvent from tank 2 overflows continuously into tank 1 through a device 29 formed by a simple channel.

The tank 1 is fed continuously with the drying composition by means of the pump 30 through the conduit 31 and the inlet 32 positioned in such a manner as to introduce said composition in the middle of the bath contained in the tank 1.

The excess of liquid in the tank 1 overflows continuously into the decantation tank 33 through a duct 34 formed by a simple channel. The vapor rising in the space 5 is retained by the deflector 35.

The water eliminated in the tank 1 condenses into droplets which rapidly form, owing to agitation of the liquid bath, to form an aqueous layer which is easy to decant into the decantation tank 33.

The decantation tank 33 is internally divided into two compartments 36 and 37 by the partition 38 which rises to a level slightly higher than the bottom of deflector 35.

The water decanted in the upper part of the bath contained in the decantation tank 33 is eliminated through the orifice 39.

The composition is recycled to the tank 1 by means of pump 30 through the outlet 40 and the conduit 41.

The bath D, contained in the tank 42, is maintained at boiling point by means of a heating device 43, for example an electric heater.

The vapors produced in tank 42 rise into the space 44 situated above said tank and surrounded by the walls 45 and are condensed by the coils 46 in which circulate a cold fluid, such as water. The coils 46 are fixed to the upper parts of the walls 45.

The condensate obtained by condensation of the vapors rising in the space 44 is recovered in the channel 47 and flows through the duct 48 into a water separator 49 similar to separator 14 composed of a tank divided internally by the two partitions 50 and 51 (see FIG. 4) into three compartments 52, 53 and 54 which only communicate with each other at their lower parts.

The water separator 49 comprises an inlet 55 for the water/solvent mixture, an outlet 56 for water, an outlet 57 for solvent, a cooling jacket 58 in which circulates a cold fluid, such as water, and a draining valve 59.

The water separator 49 has as its object the elimination of water which may be found in the condensate and which is obtained from atmospheric humidity.

The water/solvent mixture, arriving through the duct 48, enters the separator 49 through the inlet 55 and separates into its constituents by decantation in the first compartment 52 of the separator 49.

The greatest part of the water which separates is located in the compartment 53 and is eliminated by the outlet 56. By gravity, the solvent passes alone into the compartment 54 and returns to the tank 42 by the outlet 57, a duct 60 and the inlet 61.

The apparatus is completed by the emptying valve 62, 63, 64, 65, 66, 67 and 68.

The start-up of the apparatus is effected in the following manner:

The tank 8 is filled with pure solvent such that the bath thus constituted extends to the upper part of the partition 27.

The tank 2 is filled with pure solvent in such a manner that the bath thus formed extends to the upper part of the device 29 when it is heated to boiling.

The compartments 17, 18 and 19 of the water separator 14 are filled with pure solvent until the solvent reaches the outlet 22.

The tank 1 is filled with the drying composition in such a manner that the bath thus formed extends to the upper part of the duct 34 when it is heated to boiling.

There are filled in the same way the compartments 36 and 37 of the decantation tank 33 with the drying composition to a level which is slightly higher than the upper level of the partition 38. In order to avoid loss of solvent due to evaporation, the composition contained in the decantation bath 33 is covered with a layer of water such that its upper level extends to the orifice 39.

The tank 42 is filled with pure solvent.

The compartments 52, 53 and 54 of the water separator 49 are filled with pure solvent until the solvent extends to the outlet 57.

The heating devices 3, 4 and 43 are switched on as well as the cooling circuits 7, 11, 22, 46 and 57 and the pump 30.

Once the conditions of operation are achieved, the equilibria of the levels is adjusted by addition or removal of pure solvent.

The heating capacity necessary is a function of the dimensions of the tanks and thus of the volume of the baths and of the heat capacity and temperature of the articles introduced and of the cooled liquid returned into the tanks 1, 2, 8 and 42.

Examples given below illustrate the invention applied to drying of printed electronic circuits. There is used as drying composition the compositions described in the copending application Ser. No. 413,607.

EXAMPLE 1

This example is given for comparison.

There is used a process comprising a single rinsing in a bath of 1,1,2-trichloro-1,2,2-trifluoroethane maintained at boiling point.

After immersion in water, 500 printed circuits are immersed for 3 minutes in the bath, for elimination of water, consisting of the drying composition maintained at boiling point. The circuits are then immersed for 2 minutes in the rinsing bath consisting of 1,1,2-trichloro-1,2,2-trifluoroethane maintained at boiling point.

The circuits recovered from the rinsing baths are perfectly dry but contain traces of surface active agent.

EXAMPLE 2

This example is given for comparison.

There is used a process comprising two successive rinsings in two baths of 1,1,2-trichloro-1,2,2-trifluoroethane maintained at boiling point.

After immersion in water, 500 printed circuits are immersed for 3 minutes in the bath, for elimination of water, consisting of the drying composition maintained at boiling point. The circuits are then immersed for 2 minutes in the first rinsing bath consisting of 1,1,2-trichloro-1,2,2-trifluoroethane maintained at boiling point and then for 2 minutes in the second rinsing bath also consisting of 1,1,2-trichloro-1,2,2-trifluoroethane maintained at boiling point.

The circuits recovered from the second rinsing bath are perfectly dry but contain traces of surface active agent.

EXAMPLE 3

This example is given by comparison.

There is used a procedure comprising a first rinsing in a bath of 1,1,2-trichloro-1,2,2-trifluoroethane maintained at a temperature considerably less than the boiling point and a second rinsing by means of vapor rising in the space above the bath for elimination of water and the rinsing bath.

After immersion in water, 500 printed circuits are immersed for 3 minutes in the bath for elimination of water consisting of a drying composition maintained at boiling point. The circuits are then immersed for 2 minutes in the rinsing bath consisting of 1,1,2-trichloro-1,2,2-trifluoroethane maintained at 30°C and for 25 seconds in the vapor rising in the space above the bath for elimination of water and the rinsing bath.

The circuits recovered from said vapor are free from traces of surface active agent but contain traces of water.

EXAMPLE 4

There is used in a process according to the invention a first rinsing in a bath of 1,1,2-trichloro-1,2,2-trifluoroethane maintained at boiling point, a second rinsing in a bath of 1,1,2-trichloro-1,2,2-trifluoroethane maintained at a temperature considerably less than the temperature of boiling and a third rinsing in the vapor leaving a third rinsing bath, also formed of 1,1,2-trichloro-1,2,2-trifluoroethane maintained at boiling point.

After immersion in water, 500 printed circuits are immersed for 3 minutes in the bath for elimination of water consisting of a drying composition, maintained at boiling point. The circuits are then immersed for 2 minutes in the first rinsing bath, for 2 minutes in the second rinsing bath for rinsing maintained at 30°C, then for 25 seconds in the vapor leaving the third rinsing bath maintained at boiling point.

The circuits recovered from said vapor are perfectly dry and free from surface active agent.

It will be understood that changes can be made in formulation, apparatus and operating conditions, without departing from the spirit of the invention, especially as defined in the following claims.

We claim:

1. A process for removing water from the surface of an article in which said article is immersed successively (i) in a bath (A), for removal of water, maintained at boiling point consisting of a liquid drying composition which is not miscible with water and which comprises a solvent, (ii) in a rinsing bath (B) also maintained at boiling point consisting of said solvent, (iii) in a rinsing bath (C) consisting of said solvent maintained at a temperature appreciably less than its boiling point, and (iv) in the vapor emitted by a bath (D) consisting of said solvent maintained at boiling point, the following operations being carried out continuously,
   a. separately condensing the vapors leaving baths A and B and the vapors leaving bath C, removing water contained in the condensate, passing the condensed solvent into the bath C, passing excess solvent from bath C into bath B, passing excess solvent in bath B into bath A and recycling the excess of liquid from said bath A into bath A after elimination of water therefrom,
   b. condensing the vapor leaving bath D, removing water contained in the condensate, and recycling the solvent to bath D.

2. A process as claimed in claim 1, in which the solvent is 1,1,2-trichloro-1,2,2-trifluoroethane and the difference between the temperature of bath C and the boiling point of the solvent is at least 10°C.

3. A process as claimed in claim 1, in which the article is immersed in each of the baths A, B and C for from 1 to 3 minutes.

4. A process as claimed in claim 1, in which the article is immersed in vapor leaving bath D for from 15 to 30 seconds.

5. A process as claimed in claim 1, in which at least one of baths A and B is agitated ultrasonically and the condensate obtained by condensation of vapor from baths A and B is boiled continuously before removal of water therefrom.

6. Apparatus for removing water from the surface of an article by immersion in a liquid composition which is not miscible with water comprising a water-removal tank for containing said composition having means for heating the composition therein, at least one decantation tank for separating water from said composition and a recycling circuit for the liquid composition connecting the decantation tank to the water-removal tank, a first rinsing tank having means for heating rinsing liquid contained therein, positioned adjacent the water-removal tank, having a space situated above the water-removal tank and first rinsing tank being surrounded by walls, a condenser about the upper parts of the walls, means for passing excess liquid from the first rinsing tank into the water-removal tank and means for passing excess liquid from the water-removal tank into the decantation tank, a second rinsing tank having a space thereabove being surrounded by walls, a condenser about the upper parts of the walls, means for passing excess liquid from the second rinsing tank into the first rinsing tank, means for recovering the condensates obtained by condensation of vapor rising respectively in the space above a water-removal tank and the first rinsing tank and in the space above the second rinsing tank, means for eliminating any water contained in said condensates and means for passing the condensed solvent into the second rinsing tank, and a third rinsing tank having means for heating liquid contained therein, having a space above the third rinsing tank surrounded by walls, a condenser about the upper parts of the walls, means for eliminating any water contained in the condensate obtained therefrom and means for passing the condensed solvent into the third rinsing tank.

7. Apparatus as claimed in claim 6, characterized in that the means for removing water contained in the condensate obtained by condensation of vapors rising in the space situated above the water-removal tank and the first rinsing tank comprise a vessel provided with heating means for boiling the condensate and surmounted by means for condensing the vapor so obtained.

8. Apparatus as claimed in claim 6, having means for ultrasonically agitating the liquid contained in at least one of the first and second rinsing tanks.

* * * * *